US008025455B2

United States Patent
Huang et al.

(10) Patent No.: US 8,025,455 B2
(45) Date of Patent: Sep. 27, 2011

(54) FIXING DEVICE FOR AN EXTENSION TUBE OF AN EXERCISE DEVICE

(75) Inventors: Hsuan Fu Huang, Taipei (TW); Tsung Chi Chang, Taipei (TW); Shang-Wei Yeh, Taipei (TW)

(73) Assignee: Michael Lin, Taipei (TW)

( * ) Notice: Subject to any disclaimer, the term of this patent is extended or adjusted under 35 U.S.C. 154(b) by 244 days.

(21) Appl. No.: 12/586,585

(22) Filed: Sep. 24, 2009

(65) Prior Publication Data

US 2011/0070021 A1  Mar. 24, 2011

(51) Int. Cl.
*B25G 3/18* (2006.01)
*F16B 21/00* (2006.01)
*F16D 21/00* (2006.01)

(52) U.S. Cl. .................. 403/322.4; 403/109.1; 280/287; 482/121

(58) Field of Classification Search .... 403/109.1–109.5, 403/322.4, 374.5, 375, 376, 377; 482/121–130; 280/278, 287, 288.4; 248/219.3, 220.21, 248/230.1
See application file for complete search history.

(56) References Cited

U.S. PATENT DOCUMENTS

| | | | | |
|---|---|---|---|---|
| 4,497,092 A * | 2/1985 | Hoshino | ....................... | 403/104 |
| 4,596,484 A * | 6/1986 | Nakatani | ....................... | 403/104 |
| 4,761,092 A * | 8/1988 | Nakatani | ....................... | 403/104 |
| 5,135,330 A * | 8/1992 | Chen | .......................... | 403/374.5 |
| 5,154,449 A * | 10/1992 | Suei-Long | ..................... | 285/298 |
| 5,690,445 A * | 11/1997 | Wu | ............................... | 403/306 |
| 5,909,760 A * | 6/1999 | Tsai | ................................ | 16/429 |
| 5,947,666 A * | 9/1999 | Huang | .......................... | 410/151 |
| 5,975,592 A * | 11/1999 | Lin | ................................ | 292/37 |
| 5,988,963 A * | 11/1999 | Shiau | ........................... | 410/151 |
| 6,247,882 B1* | 6/2001 | Huang | .......................... | 410/151 |
| 6,421,868 B1* | 7/2002 | Tran | .............................. | 15/49.1 |
| 6,837,642 B1* | 1/2005 | Lin | ............................. | 403/109.1 |
| 6,854,916 B2* | 2/2005 | Hsieh | ......................... | 403/109.3 |
| 7,025,383 B2* | 4/2006 | Canale | ........................... | 285/7 |
| 7,066,676 B2* | 6/2006 | Tsai | ............................ | 403/109.3 |
| 7,097,380 B2* | 8/2006 | Lee | ............................. | 403/109.2 |
| 7,198,236 B2* | 4/2007 | Warner | ...................... | 248/125.8 |
| 7,293,934 B1* | 11/2007 | Huang | ....................... | 403/109.1 |
| 7,410,135 B1* | 8/2008 | Dibble et al. | ............ | 248/220.21 |

* cited by examiner

*Primary Examiner* — Michael P Ferguson
*Assistant Examiner* — Nahid Amiri
(74) *Attorney, Agent, or Firm* — Charles E. Baxley

(57) ABSTRACT

A fixing device for an extension tube of an exercise includes an outer tube and an inner tube received in the outer tube, wherein the extension tube extends through the inner tube. A quick release device laterally mounted to an outer periphery of the outer tube. The quick release device extends through the outer tube and the inner tube to quickly fixing/releasing the extension tube when adjusting the stretching distance of the extension tube.

6 Claims, 4 Drawing Sheets

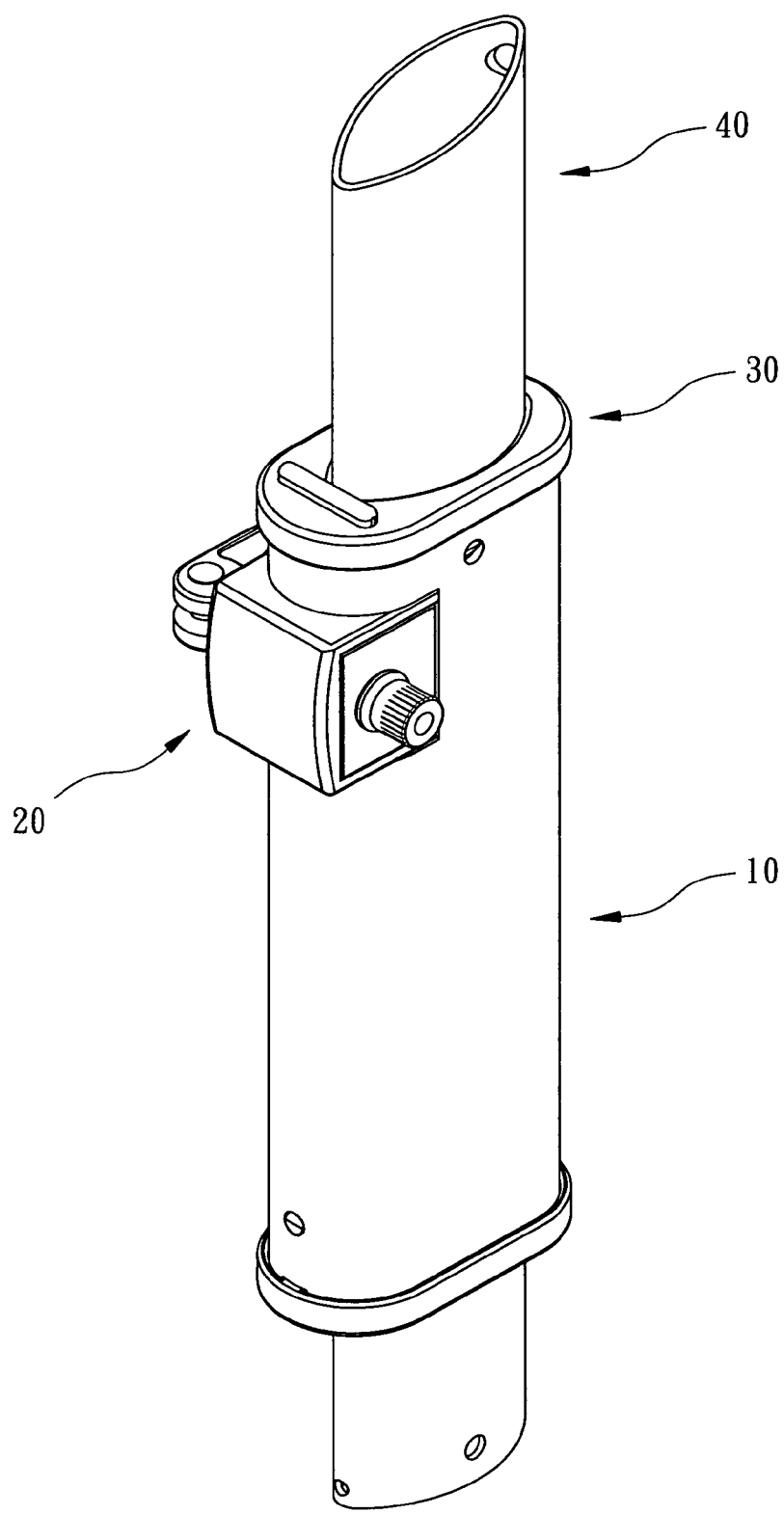
F I G . 1

FIXING DEVICE FOR AN EXTENSION TUBE OF AN EXERCISE DEVICE

BACKGROUND OF THE INVENTION

1. Field of the Invention

The present invention relates to a fixing device, and more particularly to a fixing device for an extension tube of an exercise device.

2. Description of Related Art

Nowadays, there are more and more peoples can not set aside a little time to take exercise outdoors such that many types exercise device are marketed for these peoples who are busy but want to take exercise. For mass-production, these exercise devices are usually standardized. However, users have different heights such that the exercise device usually has an extension tube disposed thereon for adjusting the height/length of a part, such as a seat, for different users. Consequently, a fixing device a necessary for securing the extension tube after adjusted to a suitable height/length.

A conventional fixing device for an extension tube of an exercise device usually only provide an actuate force, such as pushing or clamping, to enhance the friction between the fixing device and the extension tube such that the safe coefficient thereof is low. Furthermore, some conventional fixing devices can not be used to an extension tube that has an oval-shaped cross-section. They need to be advantageously altered.

The present invention has arisen to mitigate and/or obviate the disadvantages of the conventional fixing devices for an extension tube of an exercise device.

SUMMARY OF THE INVENTION

The main objective of the present invention is to provide an improved fixing device for an extension tube of an exercise device, which provides pressure in two directions.

To achieve the objective, the fixing device in accordance with the present invention comprises an outer tube and an inner tube received in the outer tube. A quick release device is laterally mounted to an outer periphery of the outer tube. The quick release device includes a bow secured on an outer periphery of the outer tube. The bow includes an inner side, facing the outer tube, has a first inclined plane and a second inclined plane respectively formed thereon, wherein the first inclined plane and the second inclined plane respectively and equally stretch relative to a center line of the bow. A first clamp block and a second block respectively are received within the bow and sequentially extending through the outer tube and the inner tube. The first clamp block has a first face formed with a first guide plane slidably abutting the first inclined plane and a second face formed with a first clamp plane adapted for selectively securely abutting against an outer periphery of the extension tube that extending through the inner tube. The second clamp block has a first face formed with a second guide plane slidably abutting the second inclined plane and a second face formed with a second clamp plane adapted for selectively securely abutting the outer periphery of the extension tube. A rod includes a first end sequentially extending through the first clamp block and the second clamp block. A lever is pivotally connected to a second end of the rod and a cam is formed on the pivot end of the lever. By operating the lever with the cam, the distance between the first clamp block and the second clamp block can be quickly adjusted to make the first clamp block and the second clamp block fixing/releasing the extension tube.

Further benefits and advantages of the present invention will become apparent after a careful reading of the detailed description with appropriate reference to the accompanying drawings.

BRIEF DESCRIPTION OF THE DRAWINGS

FIG. 1 is a perspective view of a fixing device for an extension tube of a exercise device in accordance with the present invention;

DETAILED DESCRIPTION OF THE INVENTION

Figure 2:
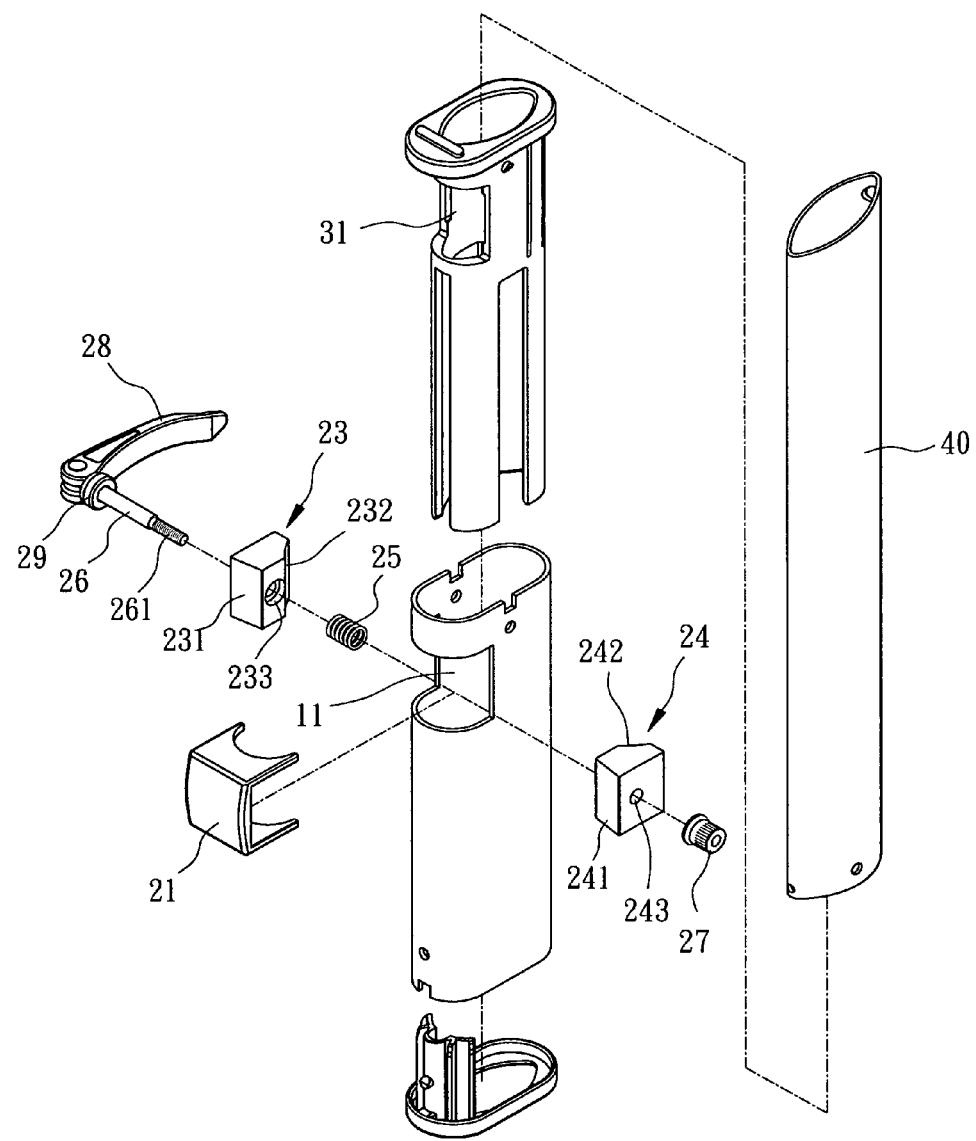
FIG. 2 is an exploded perspective view of the fixing device in FIG. 1.
Figure 3:
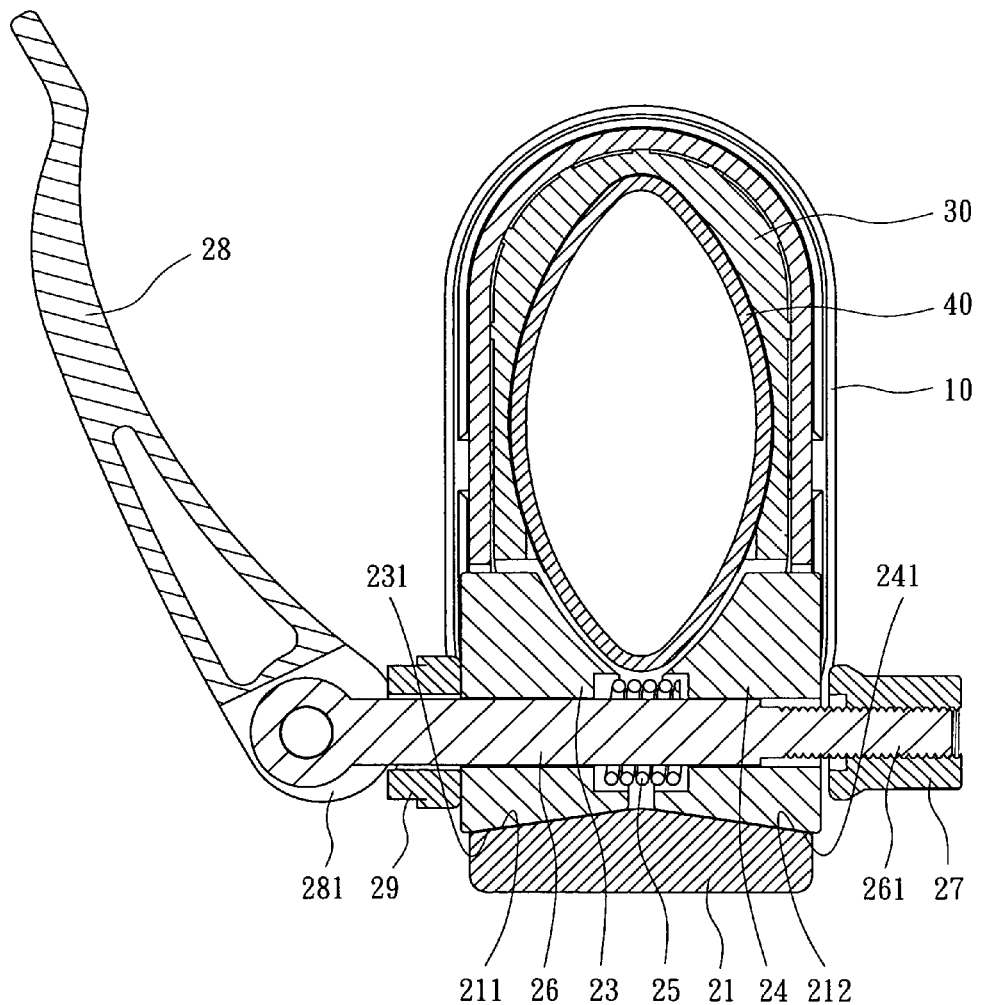
FIG. 3 is a cross-sectional view of the fixing device of the present invention when releasing the extension tube.

Referring to the drawings and initially to FIGS. 1-3, a fixing device for an extension tube of an exercise device in accordance with the present invention comprises an outer tube (10), a quick release device (20) laterally mounted to the outer tube (10) and an inner tube (30) received in the outer tube (10), wherein the extension tube (40) extends through the inner tube (30).

The outer tube (10) includes a first opening (11) defined therein. In the preferred embodiment of the present invention, the outer tube (10) is oval-shaped and the first opening (11) is defined in one end of the major axis of the outer tube (10).

The inner tube (30) has a second opening (31) laterally defined therein and completely communicating with the first opening (11) when the inner tube (30) is securely received in the outer tube (10).

The quick release device (20) includes a bow (21) secured on an outer periphery of the outer tube (10) and corresponding to the first opening (11). The bow (21) includes an inner side, facing the first opening (11), having a first inclined plane (211) and a second inclined plane (212) respectively formed thereon, wherein the first inclined plane (211) and the second inclined plane (212) respectively and equally stretch relative to a center line of the bow (21).

A first clamp block (23) and a second clamp block (24) are respectively received within the bow (21) and sequentially extending through the first opening (11) and the second opening (31). The first clamp block (23) has a first face formed with a first guide plane (231) slidably abutting the first inclined plane (211) and a second face formed with a first clamp plane (232) for selectively securely abutting an outer periphery of the extension tube (40). A first through hole (233) defined in the first clamp block (23) between the first guide plane (231) and the first clamp plane (232). The first through hole (233) has a first section and a second section, wherein the first section has a diameter greater than that of the second section. The second clamp block (24) is mirrored relative to the first clamp block (23). The second clamp block (24) has a first face formed with a second guide plane (241) slidably abutting the second inclined plane (212) and a second face formed with a second clamp plane (242) for selectively securely abutting an outer periphery of the extension tube (40). A second through hole (243) defined in the second clamp block (24) between the second guide plane (241) and the second clamp plane (242). The second through hole (243) has a first section and a second section, wherein the first section has a diameter greater than that of the second section.

The first sections of the first through hole (233) and the second through hole (243) are linearly and co-axially faced to each other.

A resilient member (25) is mounted between the first clamp block (23) and the second clamp block (24). The resilient member (25) has two opposite ends respectively received in the first section of the first through hole (233) and the first section of the second through hole (243). In the preferred embodiment of the present invention, the resilient member (25) is a compression spring.

A rod (26) has a first end sequentially extending through the first clamp block (23), the resilient member (25) and the second clamp block (24). A threaded portion (261) is formed on the first end of the rod (26). A nut (27) is screwed onto the threaded portion (261) and abutting against the second clamp block (24) for adjusting a relative distance between the first clamp block (23) and the second clamp block (24) before fixing the extension tube (40) such that the clamping force provided by the quick release device (20) is adjustable.

A lever (28) is pivotally connected to a second end of the rod (26). A cam (281) is formed on the pivot end of the lever (28). By operating the lever (28) with the cam (281) and the nut (27), the distance between the first clamp block (23) and the second clamp block (24) can be quickly adjusted to make the first clamp block (23) and the second clamp block (24) fixing or releasing the extension tube (40). A buffer (29) is sleeved on the rod (26) and disposed between the cam (281) and the first clamp block (23) to prevent the cam (281) from being overly worn out.

Figure 4:
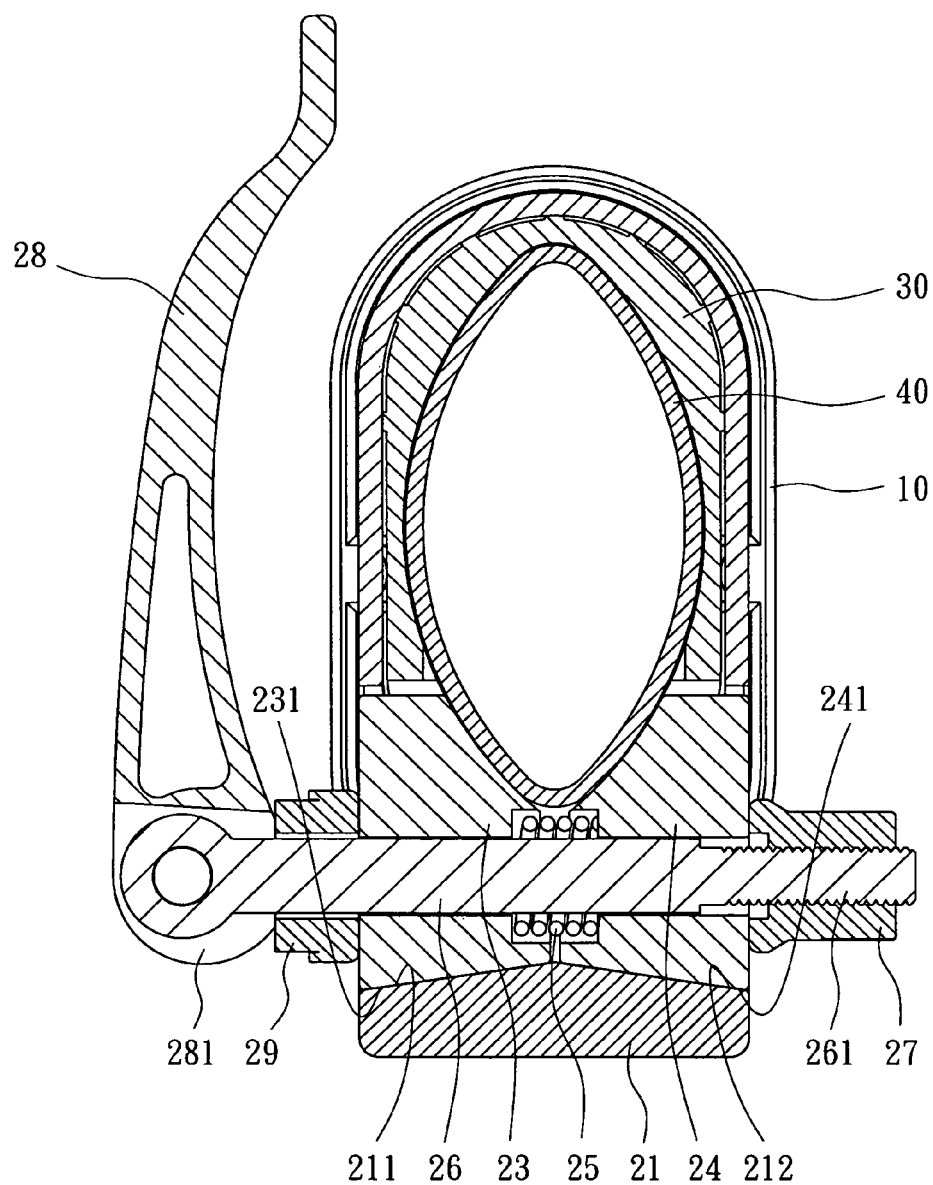
FIG. 4 is a cross-sectional view of the fixing device of the present invention when fixing the extension tube.

With reference to FIGS. 3 and 4, when adjusting the stretching distance, the lever (28) is operated to make the cam (281) being separated from the buffer (29), and the first clamp block (23) and the second clamp block (24) being distanced from each other due to the restitution force of the resilient member (25). In addition, the quick release device (20) is removed relative to the extension tube (40) due to the slidably abutted first/second inclined plane (211, 212) and the first/second guide plane (231, 241) to achieve the purpose of quickly releasing the extension tube (40), as shown in FIG. 3. As a result, the user can freely adjust the extension tube (40) relative to the quick release device (20). When the extension tube (40) being adjusted to a suitable position, the user only needs to reversely operated the lever (28) to make the cam (281) securely abutting against the buffer (29) with the first clamp block (23) and the nut (27) securely abutting against the second clamp block (24) such that the first clamp block (23) and the second clamp block (24) are approached relative to each other for securely clamping the extension tube (40) and compressing the resilient member (25). In addition, the quick release device (20) securely and laterally pushes the extension tube (40) due to the slidably abutted first/second inclined plane (211, 212) and the first/second guide plane (231, 241) to provide an extra fixing force to the extension tube (40). Consequently, the fixing device in accordance with the present invention fixes the extension tube (40) is two directions that are perpendicular relative to each other for enhancing the safe coefficient of the exercise device.

Although the invention has been explained in relation to its preferred embodiment, it is to be understood that many other possible modifications and variations can be made without departing from the spirit and scope of the invention as hereinafter claimed.

What is claimed is:

1. A fixing device for an extension tube of an exercise device comprising:
   an outer tube having a first opening laterally defined therein;
   an inner tube received in the outer tube, the inner tube having a second opening defined therein and completely communicating with the first opening; and
   a quick release device laterally mounted to an outer periphery of the outer tube and corresponding to the first opening, the quick release device includes:
      a bow secured on an outer periphery of the outer tube and co-axially corresponding to the first opening, the bow including an inner side, facing the first opening, having a first inclined plane and a second inclined plane respectively formed thereon, wherein the first inclined plane and the second inclined plane respectively and equally extend relative to a center line of the bow;
      a first clamp block received within the bow and sequentially extending through the first opening and the second opening, the first clamp block having a first face formed with a first guide plane slidably abutting the first inclined plane and a second face formed with a first clamp plane adapted for selectively securely abutting against an outer periphery of the extension tube that extending through the inner tube, a first through hole defined in the first clamp block between the first guide plane and the first clamp plane;
      a second clamp block received within the bow and sequentially extending through the first opening and the second opening, the second clamp block having a first face formed with a second guide plane slidably abutting the second inclined plane and a second face formed with a second clamp plane adapted for selectively securely abutting the outer periphery of the extension tube, a second through hole defined in the second clamp block between the second guide plane and the second clamp plane, the second through co-axially corresponding to the first through hole;
      a rod including a first end sequentially extending through the first through hole and the second through hole, and having a threaded portion formed thereon, a nut screwed onto the threaded portion and abutting against the second clamp block for adjusting a relative distance between the first clamp block and the second clamp block before fixing the extension tube; and
      a lever pivotally connected to a second end of the rod and a cam formed on the pivot end of the lever, by operating the lever with the cam and the nut, the distance between the first clamp block and the second clamp block can be quickly adjusted to make the first clamp block and the second clamp block fixing/releasing the extension tube.

2. The fixing device as claimed in claim 1, wherein the quick release device includes a resilient member on the rod and mounted between the first clamp block and the second clamp block for quickly and reversely pushing the first clamp block and the second clamp block when the extension tube is released.

3. The fixing device as claimed in claim 1, wherein the quick release device includes a buffer sleeved on the rod and disposed between the cam and the first clamp block to prevent the cam from being overly worn out.

4. The fixing device as claimed in claim 2, wherein the first through hole has a first section and a second section, the first section having a diameter greater than that of the second section, and the second through hole has a first section and a second section, the first section of the second through hole having a diameter greater than that of the second section of the second through hole, the resilient member having two opposite ends respectively received in the first sections of the first through hole and the second through hole.

5. The fixing device as claimed in claim 2, wherein the quick release device includes a buffer sleeved on the rod and disposed between the cam and the first clamp block to prevent the cam from being overly worn out.

6. The fixing device as claimed in claim 5, wherein the first through hole has a first section and a second section, the first section having a diameter greater than that of the second section, and the second through hole has a first section and a second section, the first section of the second through hole having a diameter greater than that of the second section of the second through hole, the resilient member having two opposite ends respectively received in the first sections of the first through hole and the second through hole.

* * * * *